(12) United States Patent  
Jang et al.

(10) Patent No.: US 9,041,858 B2
(45) Date of Patent: May 26, 2015

(54) IMAGE PHOTOGRAPHING APPARATUS HAVING A SLIDABLE SHUTTER ASSEMBLY

(71) Applicant: SAMSUNG ELECTRONICS CO., LTD., Suwon-si, Gyeonggi-do (KR)

(72) Inventors: Sung Min Jang, Seoul (KR); Byeong Woo Yi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 13/685,985

(22) Filed: Nov. 27, 2012

(65) Prior Publication Data

US 2013/0135522 A1 May 30, 2013

(30) Foreign Application Priority Data

Nov. 30, 2011 (KR) .................. 10-2011-0126978

(51) Int. Cl.
*H04N 5/225* (2006.01)
*G03B 9/08* (2006.01)
*G03B 17/14* (2006.01)
*G03B 17/28* (2006.01)

(52) U.S. Cl.
CPC ............... *H04N 5/2254* (2013.01); *G03B 9/08* (2013.01); *G03B 17/14* (2013.01); *G03B 17/28* (2013.01); *G03B 2217/002* (2013.01); *H04N 5/2253* (2013.01)

(58) Field of Classification Search
CPC . H04N 5/2353; H04N 5/2253; H04N 5/2254; H04N 5/2251
USPC ........... 348/367, 373, 374; 396/452, 462, 474
See application file for complete search history.

(56) References Cited

U.S. PATENT DOCUMENTS

| 7,899,311 | B1 * | 3/2011 | Kearney et al. | 396/12 |
| 8,570,381 | B2 * | 10/2013 | Solomon | 348/207.1 |
| 8,684,543 | B2 * | 4/2014 | Sakatani | 359/507 |
| 2006/0239681 | A1 * | 10/2006 | Viglione et al. | 396/535 |
| 2010/0061715 | A1 * | 3/2010 | Shintani | 396/463 |

* cited by examiner

*Primary Examiner* — Kelly L Jerabek
(74) *Attorney, Agent, or Firm* — Drinker Biddle & Reath LLP (57) ABSTRACT

An image photographing apparatus capable of maintaining the size of a sensor plate even in a case when the size of a shutter assembly is increased, the image photographing apparatus including a shutter assembly configured to control an amount of light entered, an image sensor disposed at a rear of the shutter assembly to change the light to an electrical signal, a sensor plate configured to support the image sensor, and a main frame configured such that the shutter assembly and the sensor plate are be mounted thereon, wherein the main frame includes a frame base, and a shutter mounting portion protrudedly formed from the frame base such that the shutter assembly is mounted in a sliding manner on the shutter mounting portion.

15 Claims, 7 Drawing Sheets

IMAGE PHOTOGRAPHING APPARATUS HAVING A SLIDABLE SHUTTER ASSEMBLY

CROSS-REFERENCE TO RELATED APPLICATION

This application claims the benefit of Korean Patent Application No. 2011-0126978, filed on Nov. 30, 2011 in the Korean Intellectual Property Office, the disclosure of which is incorporated herein by reference.

BACKGROUND

Embodiments of the present disclosure relate to an image photographing apparatus configured to convert light to an electric signal and store the converted electric signal.

A digital image photographing apparatus is an apparatus configured to photograph and record the image of a subject by using an image sensor such as a CCD (Charge-Coupled Device) or a CMOS (Complementary Metal-Oxide Semiconductor) that converts light that passes through a lens into electrical signals.

In particular, an image photographing apparatus having a detachable lens is referred to as an apparatus having a lens detachable from a body, which is configured to convert an image created from light that passes through the lens in an electrical form and create a file of the image.

Image photographing apparatuses having a detachable lens are becoming more popular and this market is growing. Recently, efforts are underway to reduce the size of the body of the image photographing apparatus having a detachable lens, and providing such an apparatus which is lightweight.

An image photographing apparatus is typically assembled in a manner that a shutter assembly and a sensor plate are sequentially mounted at a rear of a main frame. The sensor plate disposed at the back of the shutter assembly is mounted along with the shutter assembly at a plate mounting portion, which extends from the main frame.

The plate mounting portion is disposed at an outer perimeter of the shutter assembly, and as the size of the shutter assembly increases, the gap between the shutter assembly and the plate mounting portion also increases, and the size of the sensor plate, as a result, needs to be increased as well.

SUMMARY

According to an embodiment, there is provided an image photographing apparatus capable of maintaining the size of a sensor plate even when the size of a shutter assembly is increased.

According to an embodiment, an image photographing apparatus includes a shutter assembly, a sensor plate and a main frame. The shutter assembly may control the amount of light that enters. The image sensor may be disposed at the back of the shutter assembly to convert the light to electrical signals. The sensor plate may support the image sensor. The shutter assembly and the sensor plate may be mounted on the main frame. The main frame may include a frame base, and a shutter mounting portion. The shutter mounting portion may be protrudedly formed from the frame base such that the shutter assembly is mounted in a sliding manner on the shutter mounting portion.

The shutter mounting portion may include a first extension portion protrudedly formed from a rear surface of the frame base toward a rear side of the image photographing apparatus, and a second extension portion formed in a bent manner from one end portion of the first extension portion toward an inner side of the frame base.

The shutter mounting portion may further include a shutter slide portion that is formed while being surrounded by the frame base, the first extension portion, and the second extension portion.

The shutter assembly may be inserted into the shutter slide portion, and may be mounted on the main frame.

An edge portion of the shutter assembly may be inserted into the shutter slide portion.

The main frame may further include a plate mounting portion at which the sensor plate is mounted.

The plate mounting portion may be protrudedly formed from a rear surface of the frame base toward a rear side of the image photographing apparatus.

The plate mounting portion may be protrudedly formed from a rear surface of the second extension portion toward a rear side of the image photographing apparatus.

The sensor plate may be mounted at the plate mounting portion by using a fastening member.

According to an embodiment, an image photographing apparatus includes a shutter assembly, an image sensor, a sensor plate and a main frame. The shutter assembly may control the amount of light that enters. The image sensor may convert the light to electrical signals. The sensor plate may be disposed at the back of the shutter assembly to support the image sensor. The shutter assembly and the sensor plate may be mounted on the main frame. The main frame includes a frame base, a shutter mounting portion and a plate mounting portion. The frame base has a shape of a panel. The shutter mounting portion may be protrudedly formed from the frame base to surround an edge of the shutter assembly. The plate mounting portion may be formed at a rear of the shutter mounting portion, and at which the image sensor is mounted.

The shutter mounting portion may include an upper mounting portion and a lower mounting portion. The upper mounting portion may have an upper extension portion protrudedly formed from an upper end of the frame base, and an upper fixation portion formed in a bent manner from one end portion of the upper extension portion toward a lower side. The lower mounting portion may have a lower extension portion protrudedly formed from a lower end of the frame base, and a lower fixation portion formed in a bent manner from one end portion of the lower extension portion toward an upper side.

The shutter assembly may be mounted on the main frame while being inserted into a gap between the upper mounting portion and the frame base, and into a gap between the lower mounting portion and the frame base.

The plate mounting portion may be protrudedly formed from at least one of the upper mounting portion and the lower mounting portion toward a rear side of the image photographing apparatus.

According to another embodiment, an image photographing apparatus includes a main frame, an image sensor, a sensor plate, and a shutter assembly. The main frame may have an opening allowing light to enter therethrough. The image sensor may be disposed at the back of the main frame to convert the light to an electrical signals. The sensor plate may be mounted at the back of the main frame to support the image sensor. The shutter assembly may be disposed between the sensor plate and the main frame, and configured to be separated from and mounted at the main plate in dependent of the sensor plate.

The main frame may include a shutter mounting portion configured such that the shutter assembly slides into the shutter mounting portion and is mounted to the main frame.

The sensor plate may be fixedly mounted at the main frame by using a fastening member.

A mounting direction of the sensor plate and a mounting direction of the shutter assembly may be different from each other.

Even when the size of a shutter assembly is increased, the size of a sensor plate may be maintained, thereby resulting in a reduced size and weight of an image photographing apparatus as a whole.

A shutter assembly may be mounted and separated independent of the sensor plate.

BRIEF DESCRIPTION OF THE DRAWINGS

These and other aspects will become apparent and more readily appreciated from the following description of the embodiments, taken in conjunction with the accompanying drawings of which.

DETAILED DESCRIPTION

Reference will now be made in detail to various exemplary embodiments which are illustrated in the accompanying drawings, wherein like reference numerals refer to like elements throughout.

Figure 1:
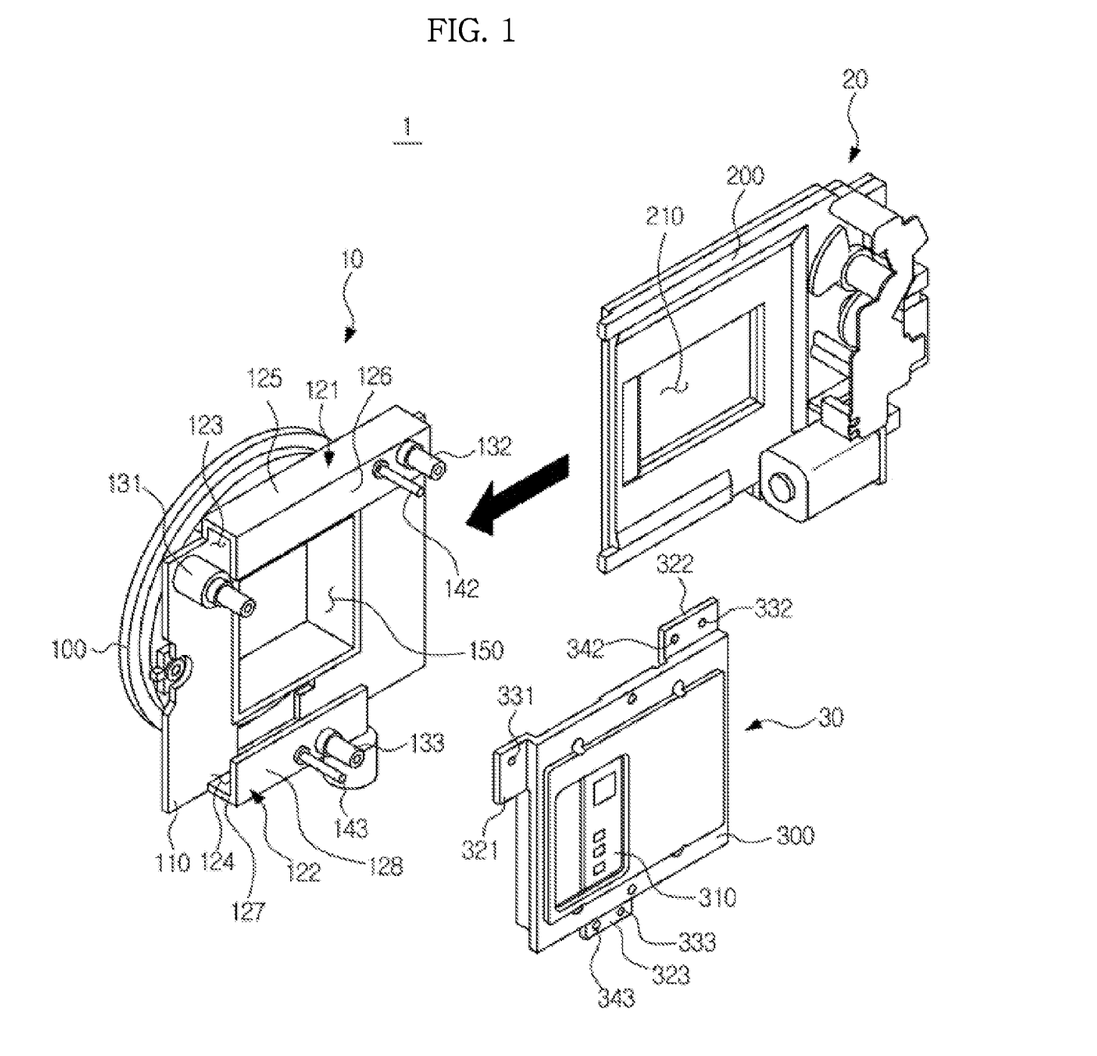
FIG. 1 is an exploded perspective view illustrating a portion of an image photographing apparatus in accordance with an embodiment.

As illustrated in FIG. 1, an image photographing apparatus includes a main frame 10, a shutter assembly 20 disposed behind the main frame 10, and a sensor plate 30 disposed behind the shutter assembly 20.

A frame base 110 forms the body of the main frame 10. The frame base 110 may be formed in a panel shape, and include a first opening 150 formed at a center of the frame base 110, such that light enters therethrough.

A mount portion 100 is formed at the front of the frame base 110, such that a lens (not shown) may be mounted on the mount portion 100. The mount portion 100 is formed in a shape of a ring, such that light enters therethrough while the lens is mounted on the mount portion 100. That is, the first opening 150 passes through the frame base 110 and the mount portion 100. A lens mounting structure (not shown) may be provided on the edge of the front surface of the mount portion 100, such that the lens may be mounted on the lens mounting structure (not shown).

Shutter mounting portions 121 and 122 are formed at an upper end and a lower end of the frame base, respectively, such that the shutter assembly 20 may be mounted on the shutter mounting portions 121 and 122.

The upper shutter mounting portion 121 includes an upper extension portion 125 extendedly formed from an upper end of the frame base 110 in a rearward direction, and an upper fixation portion 126 formed at a downward angle from the upper extension 125.

An upper end of the frame base 110, the upper extension portion 125, and the upper fixation portion 126 form an upper shutter sliding portion 123 into which an upper edge of the shutter assembly 20 may be slidingly inserted.

The lower shutter mounting portion 122 includes a lower extension portion 127 extendedly formed from a lower end of the frame base 110 in a rearward direction, and a lower portion fixation portion 128 formed at an upward angle from the lower extension portion 127.

A lower end of the frame base 110, the lower extension portion 127, and the lower portion fixation portion 128 form a lower shutter sliding portion 124 into which a lower edge of the shutter assembly 20 may be slidingly inserted.

The sensor plate 30 may be fixed to three sensor mounting portions 131, 132, and 133. In the embodiment, three sensor mounting portions are illustrated, but more or less than three sensor mounting portions may be provided 128.

The first sensor mounting portion 131 extends rearward from an upper end of the left side of the frame base 110.

The second sensor mounting portion 132 extends rearward from a rear surface of the upper fixation portion 126. The third sensor mounting portion 132 extends rearward from a rear surface of the lower fixation portion.

When the sensor plate 30 is mounted on the sensor mounting portions 131, 132, and 133, rearwardly extending position determining protrusions 142 and 143 disposed on the rear surfaces of the upper portion fixation portion 126 and the lower portion fixation portion 128 and which are adjacent to the second sensor mounting portion 132 and the third sensor mounting portion 133, facilitate mounting the sensor plate 30 to main frame 10.

A shutter frame 200 forms the body of the shutter assembly 20. A second opening 210 is formed in a central portion of the shutter frame 200, such that light may pass through the second opening 210. A shutter (not shown) capable of moving swiftly to open and close the second opening 210 is accommodated inside the shutter frame 200.

As the shutter assembly 20 is mounted on the main frame 10, the second opening 210 aligns with the first opening 150. The light passes through the first opening 150 and the second opening 210 to the image sensor 310.

A plate body 300 forms the exterior of the sensor plate 30.

The image sensor 310 is mounted on the front surface of the plate body 300. The image sensor 310, the sensor plate 30, with the image sensor 310, is mounted on the main frame 10, so that the image sensor faces the first opening 150.

The image sensor 310 may be a CCD (Charge-Coupled Device) or a CMOS (Complementary Metal-Oxide Semiconductor) sensor or other sensor that converts light that passes through the shutter assembly 20 into an electrical signal.

Sensor plate fastening portions 321, 322, and 323 are formed at positions corresponding to the sensor mounting portions 131, 132, and 133 of the main frame 10. While three sensor plate fastening portions 321, 322, and 323 and three sensor mounting portions 131, 132, and 133, are illustrated more or less can be provided. In accordance with this embodiment, it is preferred that the total number of the sensor fixation portions and the total number of the sensor mounting portions are the same.

The sensor plate fastening portions 321, 322, and 323 protrude from an upper side, a lower side, and a left side of the plate body 300, respectively, such that the position of the sensor plate fastening portions 321, 322, and 323 correspond to the position of the sensor mounting portions 131, 132, and 133.

At the first sensor plate fastening portion 321 that corresponds to the first sensor mounting portion 131, a first sensor fastening hole 331 is formed, such that the first sensor fastening portion 321 may be fastened to the first sensor mounting portion 131.

Likewise, a second sensor plate fastening hole 332 and a third sensor plate fastening hole 333 are formed at corresponding positions of the second sensor fixation portion 322 and the third fixation portion 323, respectively. Position determining holes 342 and 343 are formed in the second sensor plate fastening portion 322 and third sensor plate fastening portion 323 at positions corresponding to the position determining protrusions 142 and 143, respectively.

Hereinafter, an operation to mount the shutter assembly 20 to the main frame 10, and to mount the sensor plate 30 to the main frame 10 will be described.

Figure 2:
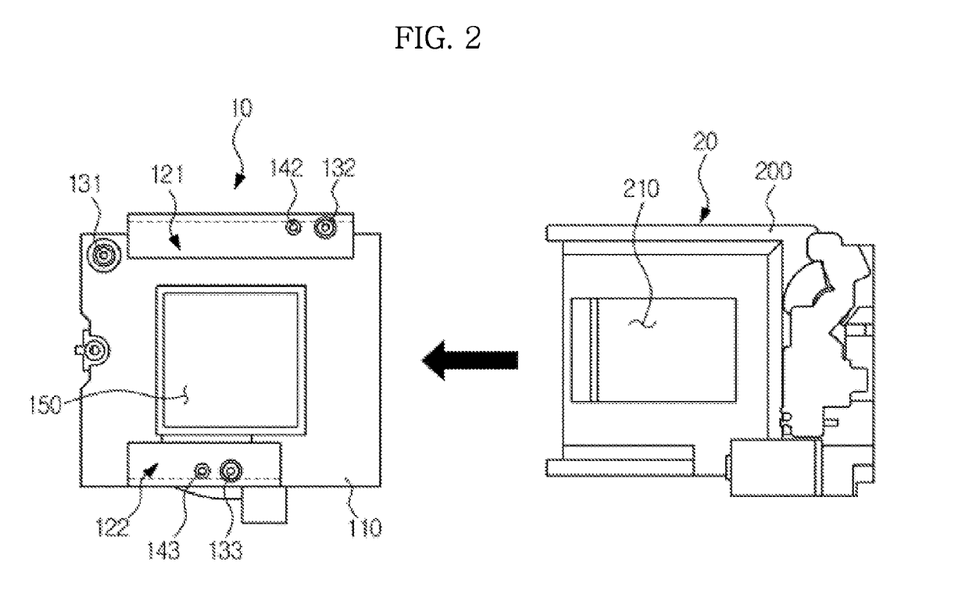
FIG. 2 is a view illustrating a main frame and a shutter assembly in accordance with an embodiment.

FIG. 2 is a view illustrating a main frame 10 and a shutter assembly in accordance with one embodiment.

As illustrated on FIGS. 1 to 2, the edges of an upper side and a lower side of the shutter assembly 20 are inserted into the shutter sliding portions 123 and 124, and the shutter assembly 20 slides in from the left side to the right side such that the shutter assembly 20 is mounted within the shutter mounting portions 121 and 122 of the main frame 10.

As the shutter assembly 20 is mounted in the main frame 10, the first opening 150 and the second opening 210 are aligned with each other.

Figure 3:
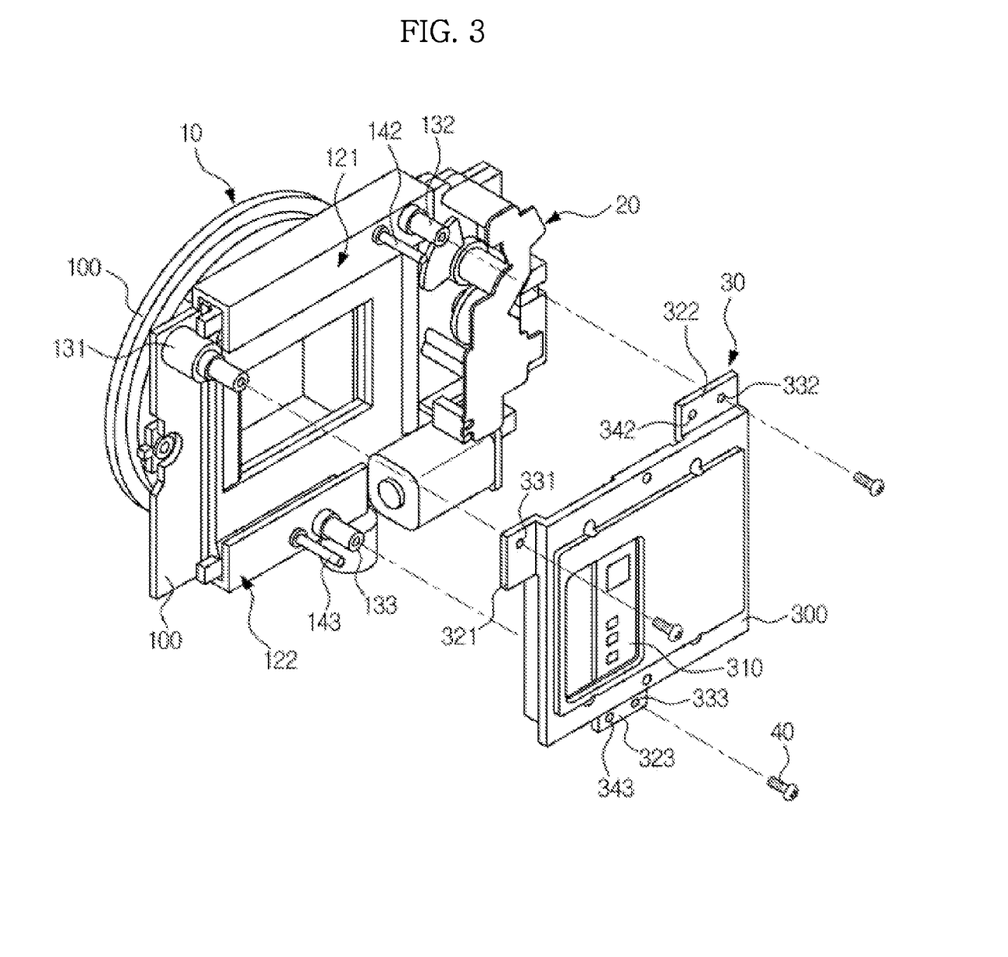
FIG. 3 is a perspective view illustrating a main frame having a shutter assembly mounted thereto and a sensor plate in accordance with an embodiment.

FIG. 3 is a perspective view illustrating a main frame having a shutter assembly and a sensor plate mounted thereto in accordance with an embodiment.

As illustrated in FIG. 3, the sensor plate 30 is mounted behind the main frame 10, within which the shutter assembly 20 is mounted.

By having the sensor plate 30 positioned behind the main frame 10, and inserting the position determining protrusions 142 and 143 into the position determining holes 342 and 343, respectively, the sensor plate 30 is coupled to the main frame 10 at a precise position. Furthermore, the position determining protrusions 142 and 143 prevent the sensor plate 30 from moving and interrupting the coupling when the sensor plate 30 is coupled to the main frame 10 with fastening members 40.

As fastening members 40 are inserted into the sensor fastening portions 321, 322, and 323 of the sensor plate 30 having a fixed position, the fastening member 40, after passing through the sensor fastening holes 331, 332, and 333, is fastened to the sensor mounting portions 131, 132, and 133. The fastening members 40 fix the sensor plate 30 to the main frame 10.

Figure 4:
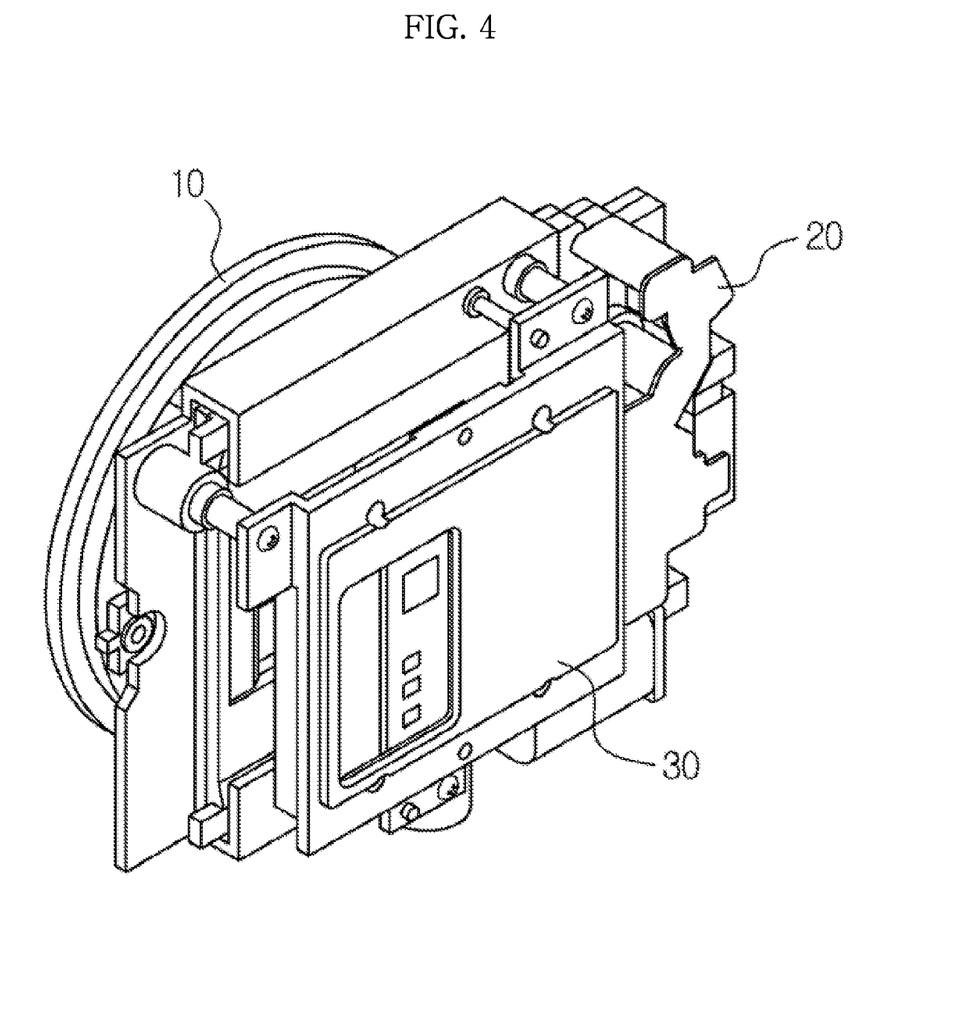
FIG. 4 is a perspective view illustrating a portion of the image photographing apparatus of FIG. 1.
Figure 5:
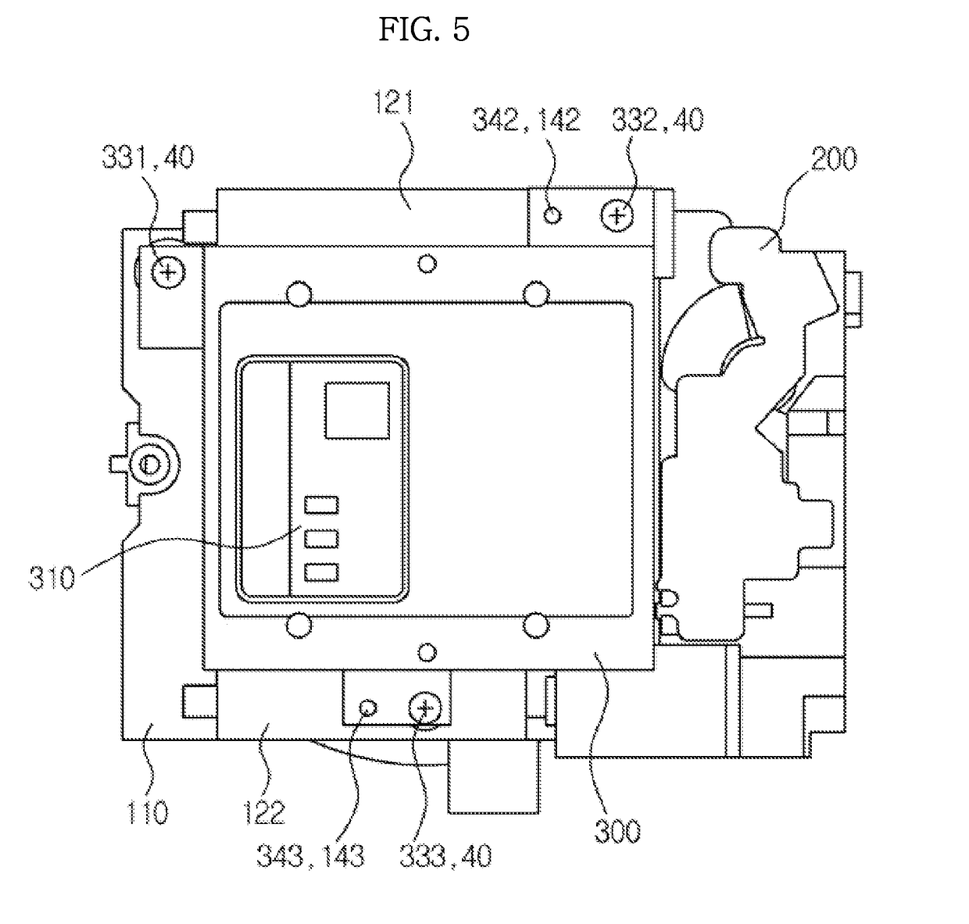
FIG. 5 is a view illustrating a rear of a portion of the image photographing apparatus of FIG. 4.

As illustrated in FIGS. 4 to 5, the shutter assembly 20 and the sensor plate 30 are mounted to the main frame 10 through the processes of FIG. 2 and FIG. 3.

The sequence of the drawings show that the shutter assembly 20 is mounted to the main frame 10, and then the sensor plate 30 is mounted to the main frame 10. However, this sequence may be changed.

The sequence may be changed because the shutter assembly 20 is mounted to the separate shutter mounting portions 121 and 122 in a sliding manner, and the sensor plate 30 is mounted in a manner independent of the mounting of the shutter assembly 20

In other words, the sensor plate 30 is mounted behind the main frame 10 by using the fastening members 40, and the shutter assembly 20 is slidingly mounted within the shutter mounting portions 121 and 122.

Even when the sensor plate 30 is mounted to the main frame 10 prior to mounting of the shutter assembly 20, the same arrangement illustrated on FIGS. 4 to 5 may be obtained.

Figure 6:
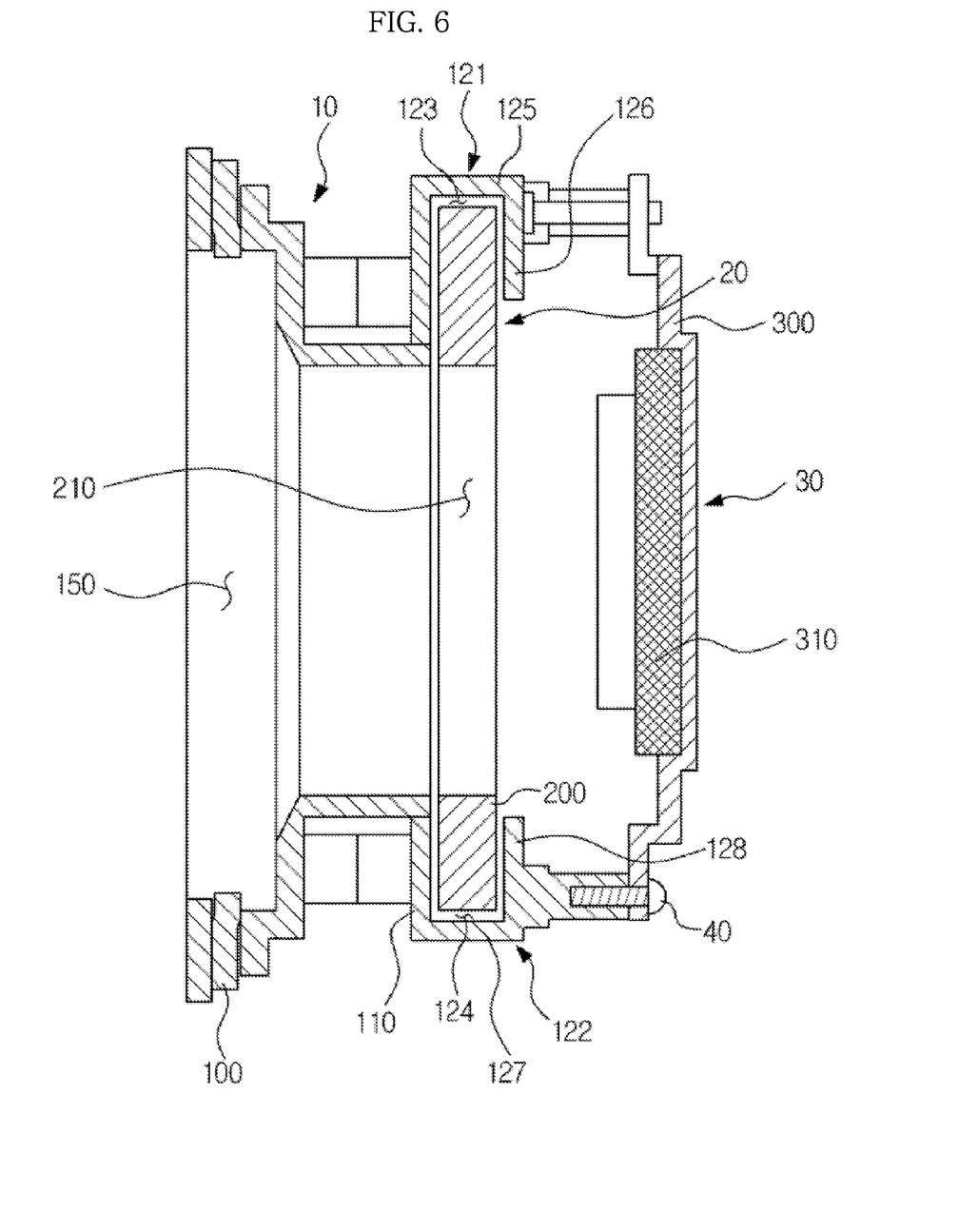
FIG. 6 is a cross-sectional view of a portion of the image photographing apparatus of FIG. 4.

As illustrated on FIG. 6, when the shutter assembly 20 and the sensor plate 30 are mounted on the main frame 10, the first opening 150, the second opening 210, and the image sensor 310 are aligned with one another. Thus, the light passes through the first opening 150 and the second opening 210, and continues to the image sensor 310.

The shutter assembly 20 is inserted into and coupled to the shutter sliding portions 123 and 124 in a sliding manner, but is not directly coupled to the sensor plate 30. Thus, the shutter assembly 20, from the sensor plate 30, may be independently mounted and separated.

In order to mount the shutter assembly 20 having a large size, the size of the main frame 10 at which the shutter assembly 20 is mounted should be large. Because the size of the frame base 110 of the main frame 10 is large, the distance between the upper shutter sliding portion 123 and the lower shutter sliding portion 124 is accordingly spaced apart, and thus, it is possible to mount a shutter assembly 20 having a relatively large size.

Even when a shutter assembly 20 having a relatively large size is used, the sensor mounting portions 132 and 133 are disposed behind the shutter fixation portions 121 and 122, and thus, as the shutter fixation portions 121 and 122 extend further toward the central portion of the frame base 110, the gap between the sensor mounting portions 132 and 133 may be maintained. Thus, the size of the sensor plate 30 does not needed to be increased.

Figure 7:
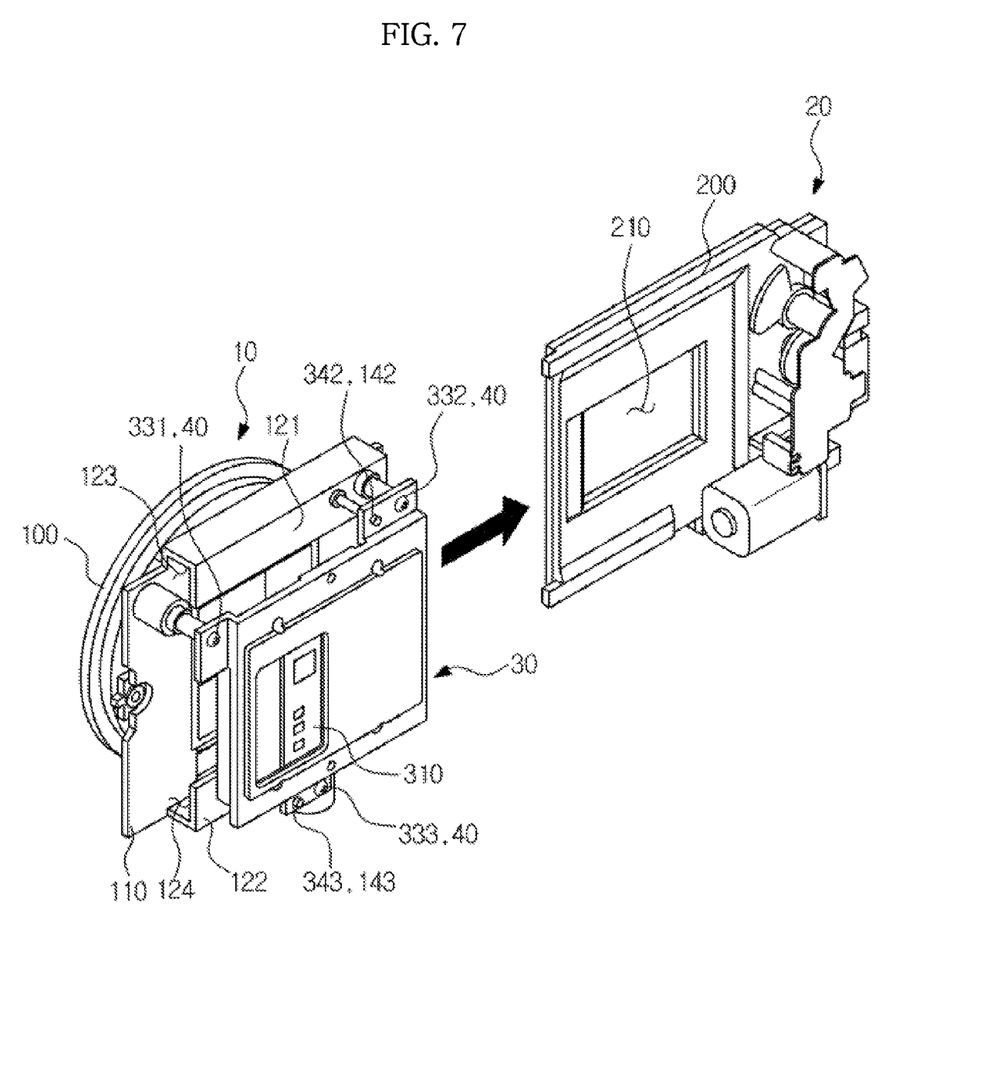
FIG. 7 is a drawing illustrating a shutter being separated from a portion of the image photographing apparatus of FIG. 4.

As illustrated on FIG. 7, when the shutter assembly 20 and the sensor plate 30 are mounted to the main frame 10, the shutter assembly 20 by itself may be separated.

The shutter assembly 20 by itself may be separated from the sensor plate 30 mounted to the main frame 10 and thus, when repair of just the shutter assembly 20 is needed, the repair may be made by separating the shutter assembly 20 by itself.

Since the sensor plate 30 is mounted at the back, the sensor plate 30 may be independently separated for repair.

Since this design allows repair to be made by separating only the component needed for the repair, the repair may be easily performed, and the time and cost for repair may be reduced.

Although a few exemplary embodiments have been shown and described therein, it would be appreciated by those skilled in the art that changes may be made within the scope of the claims and their equivalents.

What is claimed is:
1. An image photographing apparatus, comprising:
   a shutter assembly;
   an image sensor disposed behind the shutter assembly;
   a sensor plate configured to support the image sensor; and
   a main frame configured for mounting the shutter assembly and the sensor plate thereon, wherein the main frame comprises:
   a frame base; and
   a shutter assembly mounting portion protruding from the frame base to slidingly receive the shutter assembly for mounting to the frame base, wherein the shutter assembly mounting portion comprises:
   a first extension portion rearwardly protruding from the frame base, and a second extension portion formed in a bent manner from one end portion of the first extension portion toward an inner side of the frame base.

2. The image photographing apparatus of claim 1, wherein the shutter assembly mounting portion further comprises a shutter slide portion defined by the frame base, the first extension portion, and the second extension portion.

3. The image photographing apparatus of claim 2, wherein the shutter assembly is inserted into the shutter slide portion, and is secured to the main frame.

4. The image photographing apparatus of claim 3, wherein an edge portion of the shutter assembly is inserted into the shutter slide portion.

5. The image photographing apparatus of claim 1, wherein the main frame further comprises a plate mounting portion to which the sensor plate is mounted.

6. The image photographing apparatus of claim 5, wherein the plate mounting portion rearwardly extends from the image photographing apparatus.

7. The image photographing apparatus of claim 5, wherein the plate mounting portion rearwardly extends from the second extension portion of the image photographing apparatus.

8. The image photographing apparatus of claim 5, wherein the sensor plate is mounted to the plate mounting portion by using a fastening member.

9. An image photographing apparatus, comprising:
a shutter assembly;
an image sensor;
a sensor plate disposed behind the shutter assembly to support the image sensor; and
a main frame configured for mounting the shutter assembly and the sensor plate thereon, wherein the main frame comprises:
a generally planar frame base;
a shutter mounting portion protruding from the frame base to surround an edge of the shutter assembly, wherein the shutter mounting portion comprises an upper mounting portion having user extension portion protruding from an upper end of the frame base, and an upper fixation portion extending from one end of the upper extension portion; and
a plate mounting portion behind the shutter mounting portion, and to which the image sensor is mounted.

10. The image photographing apparatus of claim 9, wherein the shutter mounting portion further comprises:
a lower mounting portion having a lower extension portion protruding from a lower end of the frame base, and a lower fixation portion extending from one end of the lower extension portion.

11. The image photographing apparatus of claim 10, wherein the shutter assembly is mounted on the main frame in a gap defined between the upper mounting portion and the frame base and the lower mounting portion and the frame base.

12. The image photographing apparatus of claim 10, wherein the plate mounting portion rearwardly protrudes from at least one of the upper mounting portion and the lower mounting portion.

13. An image photographing apparatus, comprising:
a main frame having an opening allowing light to pass therethrough;
an image sensor disposed behind the main frame to convert the light to an electrical signal;
a sensor plate mounted behind the main frame and which supports the image sensor; and
a shutter assembly disposed between the sensor plate and the main frame, and configured to be separated from and mounted to the main frame independent of the sensor plate,
wherein the main frame comprises:
a frame base, and
a shutter mounting portion that slidingly receives the shutter assembly, wherein the shutter assembly mounting portion comprises:
a first extension portion rearwardly protruding from the frame base, and
a second extension portion formed in a bent manner from one end portion of the first extension portion toward an inner side of the frame base.

14. The image photographing apparatus of claim 13, wherein the sensor plate is mounted to the main frame by using a fastening member.

15. The image photographing apparatus of claim 13, wherein the mounting direction of the sensor plate and the mounting direction of the shutter assembly are different from each other.

* * * * *